May 17, 1949.   B. G. CARLSON   2,470,546
TUBE SECURING MEANS
Filed March 30, 1946   2 Sheets-Sheet 1

INVENTOR.
BERT G. CARLSON
BY Richey & Watts
ATTORNEYS

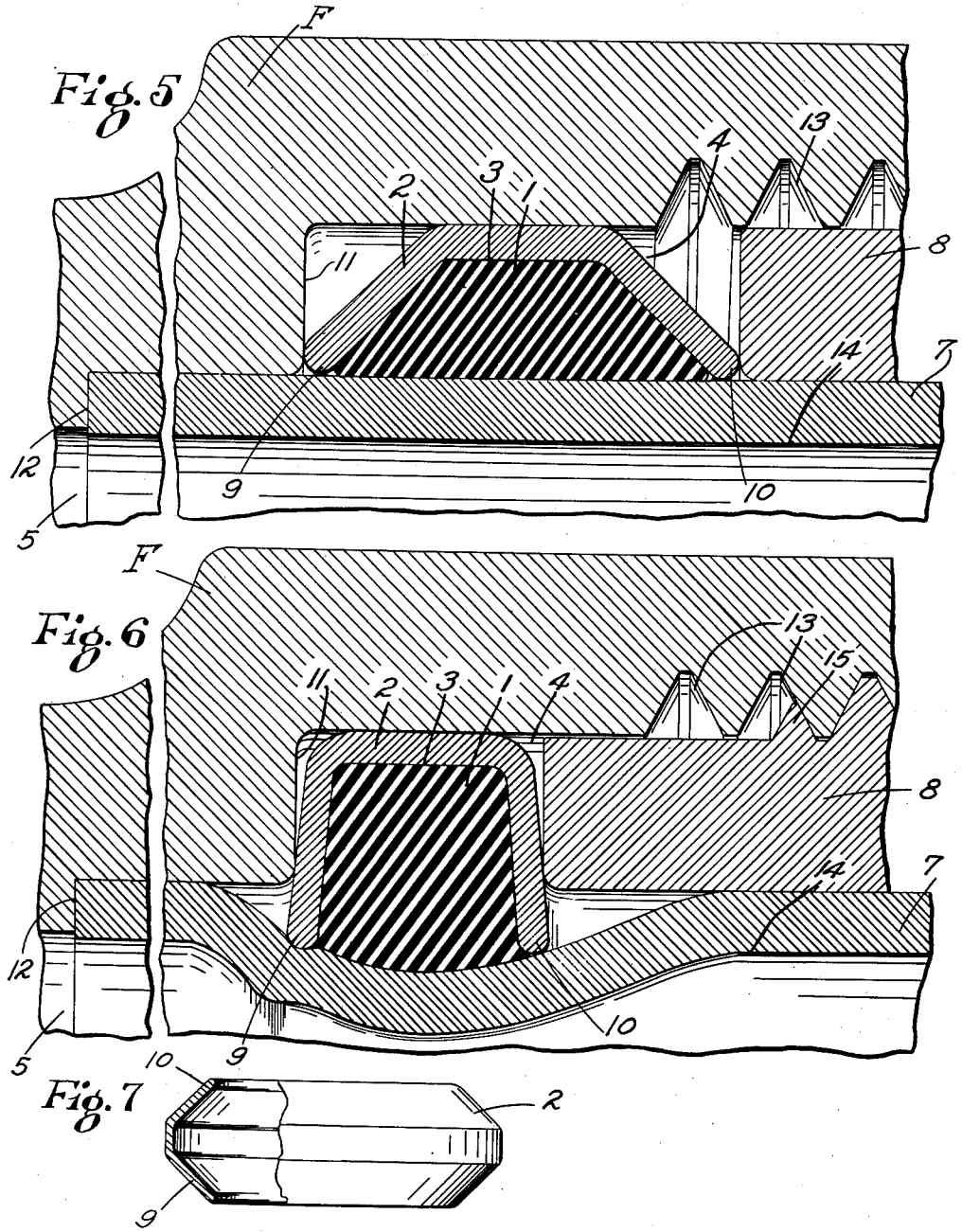

Patented May 17, 1949

2,470,546

UNITED STATES PATENT OFFICE 2,470,546

TUBE SECURING MEANS

Bert G. Carlson, Gates Mills, Ohio

Application March 30, 1946, Serial No. 658,372

2 Claims. (Cl. 285—166)

The present invention relates generally to fluid conducting systems and is especially concerned with novel means for sealing fluid conducting members in fluid tight connection.

There has always been a demand for a simple, inexpensive and effective means for connecting fluid conducting members, which has gone unsatisfied despite the numerous strenuous efforts exerted by those skilled in the art to devise such means. By virtue of this invention, means fully responding to this demand has been provided and is not limited in application to any particular kind or type of fluid conducting member, being equally suited to use with rubber or composite hoses and lead or copper tubes, for instance. Furthermore, not only does it meet this demand but possesses many desirable characteristics. When applied to metal tubing, for example, my invention provides positive sealing and positive holding over a broad range of temperature, is shock absorbing and thus protects the tubing from any vibration at the joint, is rapidly assemblable without special tools, affords the safety feature of not being overly tightenable to injure the tubing, and may be used a practically unlimited number of times without impaired effectiveness either of tubing or the sealing means. When applied to flexible hose, on the other hand, my invention enables positive sealing and positive holding of the hose in fluid tight contact because of the digging-in of the sealing means into the hose, it is also readily connected to hose without special tools and without special preparation of the hose end, it is not overloadable and is reusable an innumerable times with the same hose end.

Referring to the drawings accompanying and forming a part of this specification:

Figure 5 is an enlarged view of a portion of the assembly of Fig. 1;

Figure 6 is an enlarged view of a portion of the assembly of Fig. 2;

Figure 7 is a view, partly in section, of the shell portion of one form of sealing means of this invention; and Figure 8 is a view, partly in section, of the shell insert portion of one form of sealing means of this invention.

Figure 1:
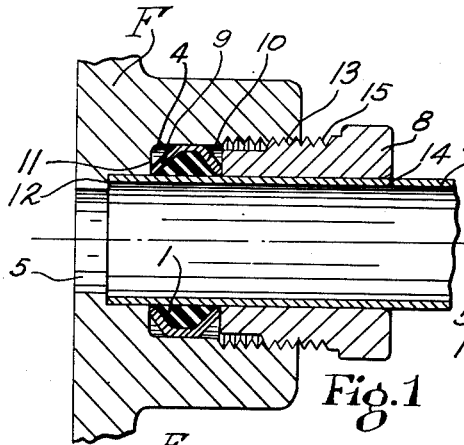
Figure 1 is a view in cross section of one form of sealing means of this invention in nonsealing assembly with a tube and a fitting.

The depicted sealing means or sealer 1 of this invention comprises an annular shell 2 and a resilient annulus 3 carried in said shell. The depicted assemblies generally comprise a fitting F having an axial aperture 4, a passageway 5, an internal sleeve 6 in one form of fitting, a fluid conducting member 7 disposed axially within said aperture, and a sleeve 8 axially disposed within said aperture and adapted for movement axially therein to accomplish the sealing effect desired or to permit unsealing by movement in the opposite direction as hereinafter described.

In cross section, as indicated in Figs. 7 and 8, my sealer 1 may suitably be generally trapezoidal. Being of resilient shell construction, preferably thin steel sheet, and having resilient filling material, suitably natural rubber, this means is deformable to generally the shape of a square in cross section, with the result that the internal diameter of the annulus or shell insert portion is materially reduced by expansion of the annulus in a radial direction and the sides 9 and 10 of the shell are moved inwardly until they approximately parallel each other and, as illustrated in Fig. 6, the open end of the side 9 deforms and grips the fluid conducting member.

With particular reference to the application of this means to an assembly involving a metal tube as the fluid conducting member and with reference to Figs. 1, 2, 5 and 6, the assembly comprises fitting F in which the axial aperture 4 is provided with an annular shoulder 11 and a second annular shoulder 12 disposed further within said fitting at the point where said aperture opens into passageway 5. Aperture 4 is further provided with threads 13 cut into the inner wall of the fitting defining said aperture in the vicinity of the outer end of said aperture.

The metal tube 14 included in the assembly as the fluid conducting member is of conventional construction and suitably of copper, lead, brass or equivalent, and is axially disposed within said aperture with an end portion abutting shoulder 12.

Sleeve 8, which is also a part of the assembly, is cylindrical and bears threads 15 on its outer surface which are designed for engagement with threads 13. The sleeve is dimensioned to fit over tube 14 and to move axially within the aperture between the tube and the inner wall of the fitting defining the larger diameter portion of the aperture, i. e., the portion between the outer or open end of the aperture and shoulder 11.

Sealer 1 completes this assembly and is disposed as a ring carried by tube 14 disposed in said larger diameter portion of the aperture in the annular space defined by said shoulder 11, the tube, the inner wall of the fitting and the end of sleeve 8 disposed within the aperture.

Figure 2:
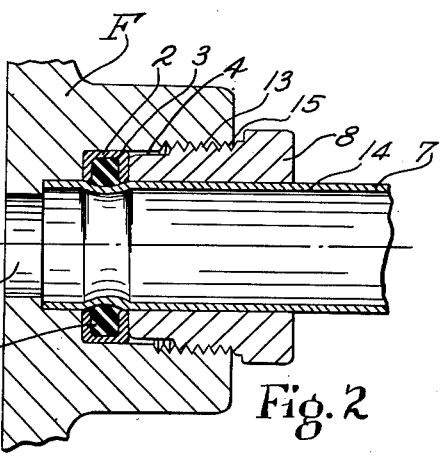
Figure 2 is a similar view except that the sealing means is disposed to effectively seal the joint of the tube and fitting.

Figs. 1 and 5, the sealing means is not in sealing contact with the fitting and tube but in Figs. 2 and 6 it is in sealing contact with the fitting and tube. It will be apparent that the transition from Fig. 1 to Fig. 2 involves rotation of sleeve 8 to further engage threads 13 and 15. Sealing means 1, being disposed in aforementioned annular space, is distorted to conform to the shape and size of that space as that shape is altered and that size is decreased by this movement of sleeve 8. Since neither the shell 2 nor the annulus 3 are compressible to conform to the dimensions of the space and still retain the same cross sectional shape when the sleeve is disposed as shown in Fig. 6, the shell undergoes the change aforementioned with the sides becoming more or less parallel and end of side 9 gripping the metal tube, as illustrated, and the annulus is radially expanded to distort the tube and cause a slight annular constriction thereof.

Relief of the pressure thus applied to the sealing means is accomplished by rotating sleeve 8 in the opposite direction and results in sealing means 1 returning substantially to its original shape, as indicated in Figs. 1 and 5, due to the resiliency of the annulus and shell. The tube is likewise substantially restored to its original condition, as shown in the latter figures, the elastic limit of the tube not having been exceeded during the aforementioned operation. The sealing effect is thus substantially eliminated and the parts may be readily disengaged by further rotation of the sleeve member and removal of that member and the tube and sealing means from the aperture and from contact with the fitting.

Figure 3:
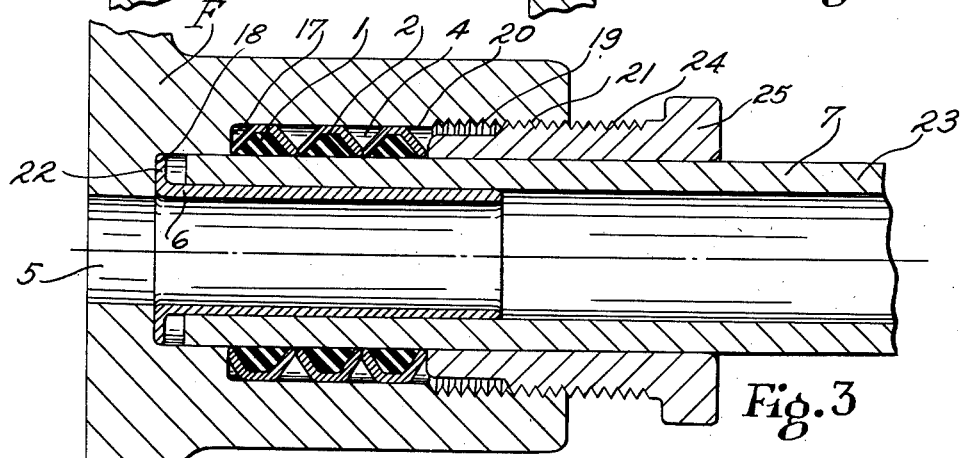
Figure 3 is a view in cross section of an assembly including one form of multiple sealing means of this invention in nonsealing assembly with hose and a fitting.
Figure 4:
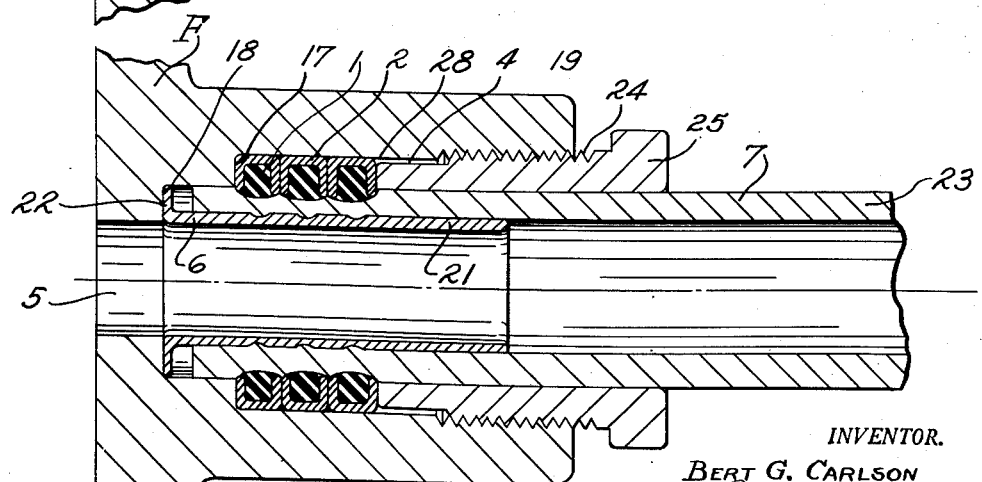
Figure 4 is a similar to that view of Fig. 3 except that said multiple sealing means is disposed in sealing arrangement with the hose and fitting.

With reference to the application of this invention to flexible hose, as illustrated in Figs. 3 and 4, the assembly comprises fitting F having axial aperture 4, internal axially disposed sleeve 6, annular shoulder 17, a second annular shoulder 18 disposed further within said fitting an axially disposed passageway 5, and threads 19 in the inner wall 20 defining said aperture in the vicinity of the outer or open end of said aperture. Said sleeve comprises a metal tube 21 having an outwardly flaring end portion 22, which portion is of approximately the same internal and external diameter as shoulder 18 and the sleeve is secured thereto through said end portion in such manner that passageway is, in effect, extended to the unflared end of said sleeve.

The hose 23 included in this assembly as the fluid conducting member is suitably of rubber or rubber-like material, is axially disposed within said aperture and receives and engages most of the length of sleeve 6, including the flared end portion 23.

Sleeve 25 of the assembly corresponds in function and construction to sleeve 8 of the foregoing assembly and, like that part, bears threads 24 on its outer surface which are intended for engagement with threads 19 as shown. As a further similarity, this sleeve 25 is dimensioned to fit over hose 23 and to move readily axially within said aperture between the hose and the inner wall of the fitting defining the larger diameter portion of the aperture, i. e. the portion between the outer or open end of the aperture and shoulder 17.

This assembly is completed with three sealing means 1 of this invention carried as rings by hose 24 and disposed within said larger diameter portion of the aperture in the annular space defined by shoulder 17, the inner wall of the fitting, the hose and the end of sleeve 8 within the aperture facing shoulder 17.

In Fig. 3 the sealers are shown in relaxed or non-sealing disposition in the assembly as indicated by the trapezoidal cross section of each of the three sealers, whereas the sealers are depicted in Fig. 4 in sealing connection with the assembly and as having substantially parallel sides and generally square cross section. Distortion of internal sleeve 6 as indicated in Fig. 4 is a result of radial deformity to decrease the internal diameter of annulus 2 and produces a gripping effect by the three annulii 2 upon the inner sleeve and the hose 14.

As in the assembly of Fig. 1, sealing was effected by axial movement of the sleeve toward the inner shoulder 18 by rotation of the sleeve and further threadwise engagement of the sleeve with the fitting.

The seal is broken when the pressure upon the sealer is relieved by rotation in the opposite direction of the sleeve member, permitting return of the sealing means to substantially their original shape and dispositions.

From the foregoing description, it will be obvious that the sides of the sealer in relaxed or nonsealing disposition function as beams and that upon being subjected to axially applied pressure by the sleeve member, they are gradually converted into columns, in effect. Thus, as the sleeve is moved axially to accomplish the desired sealing, resistance to continued movement of the sleeve by the shell of the sealer diminishes until the sides of the shell are disposed perpendicularly to the axis of the aperture and the shell offers no resistance to further axial movement of the sleeve. As the sleeve is thus axially moved to change the shape of the shell of the sealer of this invention and the rubber or elastomeric insert of said sealing means is caused to cold-flow and to effect the sealing as hereinbefore described, this insert presents increasingly great resistance to further axial movement of said sleeve.

In all the illustrated forms of this invention, the side walls of each sealer or annulus converge radially outwardly relative to the tube or hose and the walls of the abutment and the sleeve member opposing said side walls are parallel to a radial plane of said hose or tube. The side walls of the annulus each define an angle to said radial plane less than 45°, so that it as the annulus is compressed by the sleeve, the amount of force required overcome resistant to motion of the side walls thereof, diminishes. A considerable mechanical advantage is thus obtainable when it is particularly important, that is, when final sealing adjustment of the parts is to be made.

Instead of, or in addition to, having threads in its apertured portion, the fitting may suitably bear threads on its external surface and the sleeve member may be appropriately formed with a threaded portion to engage the said external surface with the same results and effects as in the illustrated form of the assembly of this invention.

It is not essential that the means of this invention be disposed as illustrated in the accompanying figures in order to realize effective sealing, or that exactly the depicted form of sealing means be employed to obtain the desired sealing results. For instance, instead of the U-shaped shell 2 opening inwardly toward the axis of the shell, it might be disposed oppositely, that is, with the shell opening outwardly away from the axis. In this case the base of the shell would bear against the tube or hose, while the ends of the arms of the shell would engage the inner wall of the fitting defining the aperture.

As described, the sealing means may be single or multiple depending upon the type of pipe or hose to be sealed and the nature of the service which the seal is to withstand. It will be appreciated that in the employment of multiple sealers, as illustrated in Figs. 3 and 4, more effort and care is required in applying the sealers to the hose of the assembly than in applying a sealer to a corresponding element, as in Fig. 1. I therefore contemplate the production of the equivalent of two, three or more single sealing means in a single integral piece which would be of the general appearance and have the same general effect as the same number of single sealers assembled together, as shown in Figs. 3 and 4.

Although in the preferred and herein illustrated form of the means of this invention, I have employed relatively thin resilient shell of stainless steel, I contemplate the use of other equivalent metals for this purpose such as copper, brass and the like. Also, instead of a rubber annulus, I contemplate an annulus of elastomeric or rubber-like materials such as the so called synthetic rubbers, and any combination of such having the resiliency necessary to meet the requirements of the sealing means herein disclosed. I also contemplate the use of composite annulli such as those of rubber and fabric having substantially the resiliency of natural rubber.

Having thus described the present invention so that those skilled in the art may be able to understand and practice the same, we state that our invention is defined in what is claimed.

What is claimed is:

1. A fitting for a fluid carrying pipe comprising a body having an opening for an end of such a pipe and having a recess defined in part by a cylindrical surface coaxial with said pipe and an abutment surface at a substantially right angle to said pipe axis, an annular metal shell having a mid-portion engageable with said cylindrical surface and side portions extending divergingly inward, a resilient annulus in said shell, said side portions and annulus engaging with the outer surface of said pipe, and a sleeve having a face substantially at right angles to the pipe axis and being movable adjustably endwise into said recess, the inner edges of said shell initially engaging the abutment surface and sleeve face whereby axial movement of the sleeve into the body serves to force the inner edges of the shell toward each other and to increase the radial length of said side portions and the pressure of said portions and said annulus on said pipe and to deform the latter inwardly.

2. A fitting for a fluid carrying pipe comprising a telescoping body and sleeve defining an opening for the end of such a pipe and having opposed, axially spaced abutment surfaces at substantially right angles to the pipe axis and an inner cylindrical surface between said abutment surfaces and co-axial with and of greater diameter than said pipe, an annular metal shell having axially spaced portions diverging inwardly and initially engageable respectively with said abutments and a portion between said diverging portions having an outer cylindrical surface engageable with said inner cylindrical surface, and a resilient annulus substantially filling said shell between said diverging portions, said body and sleeve being adjustably movable relatively and telescopically and serving when so moved to force one of said diverging sleeve portions toward the other thereby increasing the radial length of at least one of said portions and its pressure on said pipe and deforming the pipe inwardly and pressing the resilient annulus onto said pipe.

BERT G. CARLSON.

REFERENCES CITED

The following references are of record in the file of this patent:

UNITED STATES PATENTS

| Number | Name | Date |
| --- | --- | --- |
| 2,376,017 | Smallpeice | May 15, 1945 |

FOREIGN PATENTS

| Number | Country | Date |
| --- | --- | --- |
| 549,984 | France | Dec. 2, 1922 |